H. B. JOHNSON.
SPLICE FOR BALE BANDS.
APPLICATION FILED MAY 1, 1908.
910,385.
Patented Jan. 19, 1909.
2 SHEETS—SHEET 1.
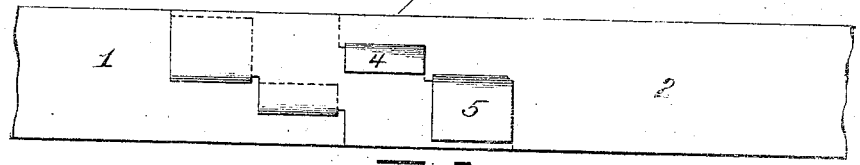
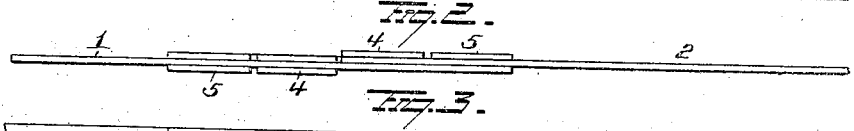
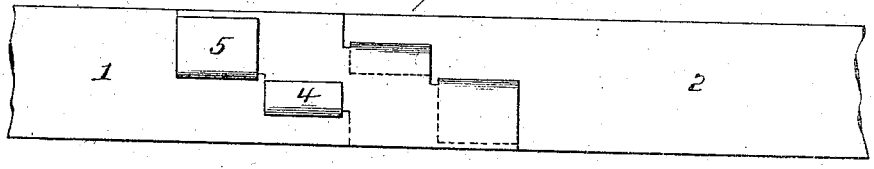
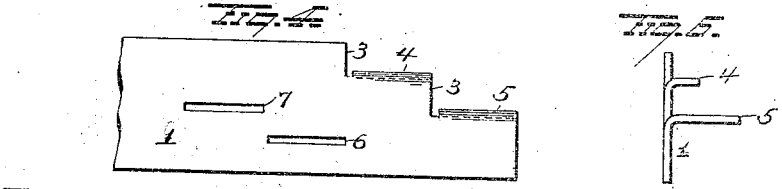
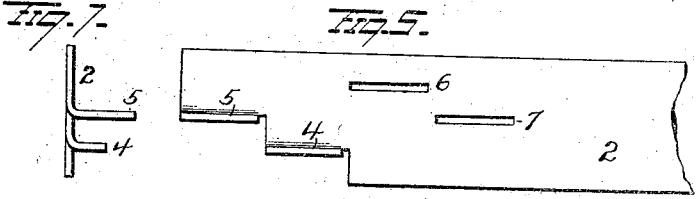
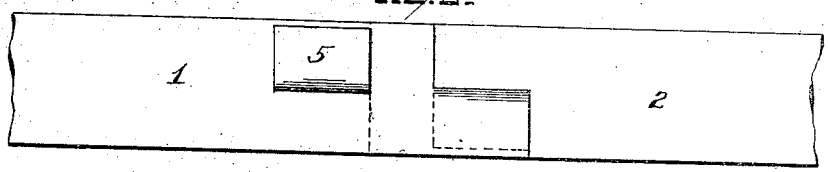
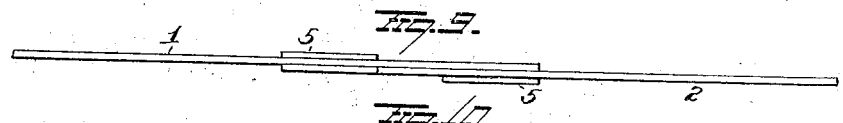
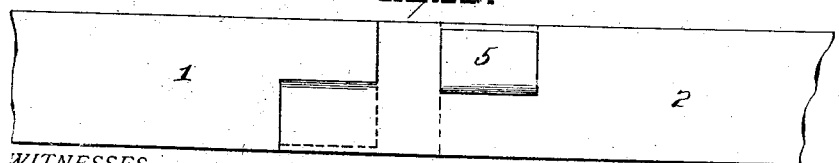
WITNESSES
INVENTOR
H. B. Johnson
By H. A. Seymour
Attorney

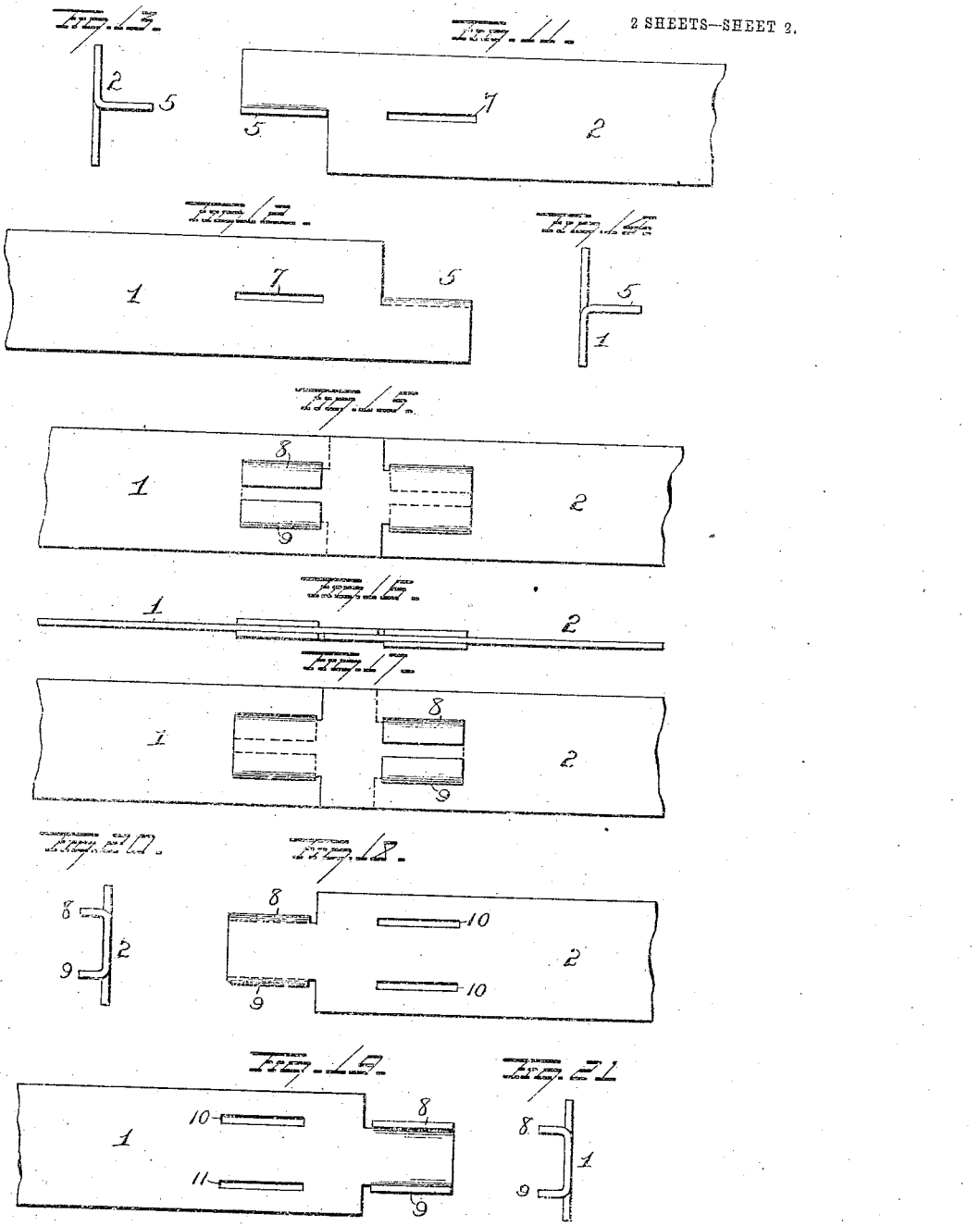

UNITED STATES PATENT OFFICE.

HOMER B. JOHNSON, OF ATLANTA, GEORGIA, ASSIGNOR TO LOCK JOINT BALE TIE COMPANY, OF ATLANTA, GEORGIA.

SPLICE FOR BALE-BANDS.

No. 910,385.  Specification of Letters Patent.  Patented Jan. 19, 1909.

Application filed May 1, 1908. Serial No. 430,351.

*To all whom it may concern:*

Be it known that I, HOMER B. JOHNSON, of Atlanta, in the county of Fulton and State of Georgia, have invented certain new and useful Improvements in Splices for Bale-Bands; and I do hereby declare the following to be a full, clear, and exact description of the invention, such as will enable others skilled in the art to which it appertains to make and use the same.

My invention relates to an improvement in splices for bale bands.

It is the universal practice, when the contents of a bale of cotton, jute or other material is to be used, to cut the bands, and by reason of the cutting, many short pieces, called scrap, are formed which are riveted to other sections to form a complete band. This method of uniting the sections is slow and expensive and the projecting heads of the rivets interferes, in some cases seriously with the operation of the machinery used in tying the ends of the band, and also interferes with the handling of the bale.

The object of my invention is to dispense with the rivets and unite the sections by tongues and slots so located as to not materially impair the strength of the band, and not project sufficiently to interfere with the tying operation, and my invention consists in the details of construction as will be more fully explained and pointed out in the claims.

In the accompanying drawings, Figure 1 is a view in plan of one form of splice. Fig. 2 an edge view and Fig. 3 a bottom plan view of the same. Figs. 4 and 5 are views in elevation of the two ends preparatory to splicing and Figs. 6 and 7 are end views of the latter. Figs. 8 to 14 inclusive are similar views of a modified form of splice, and Figs. 15 to 21 inclusive are similar views of still another modification.

1 and 2 represent two sections of a sheet metal band strip-cut or kerfed, as at 3, at its ends thus forming tongues 4 and 5, which are bent at right angles to the band, the tongue 5 being located preferably about midway the width of the band and the tongue 4 approximately midway the tongue 5 and the side edge of the band, in step like formation as shown. Each section 1 and 2 is also provided with the slots 6 and 7, of a size to easily and readily receive the tongues 4 and 5, the slots 7 being located approximately in the center of the sections to receive the longer tongues 5 of the other section, the slots 6 being in advance of the slots 7 and in a plane about midway the latter and the side edge of the section, so as to receive the shorter tongue 4 of the opposite section. With the ends of the section so provided with tongues and slots, the tongues on each section, will when the ends of the sections are overlapped, register with the slots in the other section, and after the two ends are thus assembled they are permanently secured together by bending the tongues down onto the strips as shown in Figs. 1, 2 and 3.

In the form shown in Figs. 8 to 14 inclusive I have simply omitted the shorter tongue and its slot and employ the centrally located tongue 5 and its slot 7. In both forms I prefer to bend the tongues in opposite directions, but this is not absolutely essential. In the form shown in Figs. 15 to 21 inclusive the opposite sides of the ends of the sections are slitted part way across in the same plane to form two tongues 8 and 9, which are bent at right angles to the band sections as shown in Figs. 18 and 20, and each section is provided in rear of said tongues with the parallel slots 10 and 11 located in line with the tongues. When the two ends are overlapped as shown, the tongues on each section register and enter the slots in the other section and the two sections are then permanently secured together by bending the tongues preferably inwardly toward each other as shown in Figs. 15 and 17. In all these forms, the tongues are located in advance of the slots, and as the latter need only be large enough to receive the tongues, the strength of the band is not impaired as it is in those bands where the slot is formed from the metal cut out to form the tongue. Again with my improvement the tongues are formed at the ends of the sections, consequently when a splice comes at a corner of the bale, the extreme exposed end is held down by the tongue and prevented from standing out, as they do with the riveted section, and also with sections held together by tongue and slot where the tongues are located in rear of the ends of the section. Again in the old form of spliced bands, the strain must be withstood by a comparatively short portion of the band, whereas with my improvement wherein the slots are to the rear of the tongues, the splice is longer and the strain is distributed over a greater area. Again, in those forms of splices wherein the tongues are formed from the metal of the slots, the tongues are, owing to the width of the band, necessarily so short that the material of the bale can assist but very little in holding the tongues against the band. With my improvement the tongues are longer and the material of the bale adds greatly to the strength of the joint by more effectively holding the tongues against the band.

It is evident than many slight changes might be resotred to in the relative arrangement of the parts shown and described without departing from the spirit and scope of the appended claims hence I would have it understood that I do not wish to confine myself to the exact construction and arrangement of parts shown and described, but, Having fully described my invention what I claim as new and desire to secure by Letters-Patent, is:—

1. A splice for bale band sections consisting in a tongue formed at the extreme end of each section and extending in the direction of the length of the section and a closed slot in rear of each tongue, the tongue in each section passing through the closed slot in the other section and bent back against the section.

2. A splice for bale bands consisting in a plurality of tongues formed at the end of each section, with their long diameters in the direction of the length of the sections, and corresponding closed slots in rear of the tongues, the tongues in each section passing through the slots in the other section and bent back onto the section.

3. A splice for bale bands sections consisting in a plurality of tongues in step like form at the end of each section and correspondingly located slots in rear of the tongues, the tongues in each section passing through the slots in the other section and bent back onto the section.

In testimony whereof, I have signed this specification in the presence of two subscribing witnesses.

HOMER B. JOHNSON.

Witnesses:
A. W. BRIGHT,
A. N. MITCHELL.